United States Patent [19]

Van Den Ouweland

[11] Patent Number: 4,913,923
[45] Date of Patent: Apr. 3, 1990

[54] PROCESS FOR IMPROVING OR MODIFYING THE TASTE AND AROMA OF CITRUS FRUIT COMPOSITIONS

[75] Inventor: Godefridus A. M. Van Den Ouweland, Plan-Les-Ouates, Switzerland

[73] Assignee: Firmenich SA, Geneva, Switzerland

[21] Appl. No.: 336,634

[22] Filed: Apr. 7, 1989

Related U.S. Application Data

[63] Continuation of Ser. No. 649,572, Sep. 12, 1984, abandoned.

[51] Int. Cl.⁴ .............................................. A23L 1/235
[52] U.S. Cl. ................................................... 426/533
[58] Field of Search ........................................ 426/533

[56] References Cited

PUBLICATIONS

Braverman, Citrus Products, 1949, Interscience Publishers: New York, pp. 49-56, 114-120, 122-125, 132-137, 246.

*Primary Examiner*—Joseph Golian
*Attorney, Agent, or Firm*—Pennie & Edmonds

[57] ABSTRACT

Process to improve or modify the taste and aroma of citrus fruit compositions by conferring thereto a cooked note and a more juicy fleshy and peely gustative character.

Flavor composition resulting therefrom.

8 Claims, No Drawings

PROCESS FOR IMPROVING OR MODIFYING THE TASTE AND AROMA OF CITRUS FRUIT COMPOSITIONS

This is a continuation of application Ser. No. 06/649,572, filed Sept. 12, 1984 and now abandoned.

BRIEF SUMMARY OF THE INVENTION

There is disclosed a process to improve or modify the taste and aroma of citrus fruit flavor compositions of both natural and synthetic origin by conferring thereto a cooked optionally juicy, fleshy and peely, gustative character. The process consists in reacting at a temperature of between about 50° to 120° C. an amino acid, or a mixture of amino acids, with a mixture consisting of
a. a carbohydrate selected from the group consisting of pentoses and hexoses,
b. ascorbic acid,
c. thiamine hydrochloride,
d. a concentrated citrus fruit juice or a citrus fruit oil, or alternatively a mixture of aldehydes derived from citrus fruits, and optionally water,
during a time sufficient to develop a composition which upon dilution in water possessed the desired flavor note.

There is further disclosed a flavor composition resulting from the said process, as well as an edible material comprising the said composition as one of its flavor effective ingredients.

BACKGROUND OF THE INVENTION

My invention relates to the field of flavors, more particularly, it provides a process to improve or modify the flavor character of citrus fruit flavor compositions, especially destined to concentrated orange juice or juice resulting from dissolving orange powder, a natural or artificial citrus fruit flavor composition dispersed on a solid edible support.

Experience has shown that many foods are susceptible to non-enzymic browning, especially orange powder or orange juice concentrates which undergo changes in odor and flavor during storage at room temperature or during the manufacturing process, for instance, through freeze-drying.

Strange as it may seem, consumers do not always regard such modifications as undesirable and tend to favor a juice having undergone such change in taste over freshly prepared natural ones. The consumer has thus acquired a certain degree of taste pattern recognition. This seems to be particularly the case for instance for the so-called "cooked note" that flavorists detect among the wide spectrum of flavor characters of certain citrus fruit juices.

THE INVENTION

It is an object of my present invention to provide a process which results in the improvement of citrus fruit flavor compositions, of both natural and synthetic origin, by conferring thereto a typical cooked note and a more juicy fleshy peely gustative character, thus providing an edible material that better satisfies the consumer's criteria of palatability.

Another object of my present invention is to provide a flavor composition destined to confer, enhance or improve the cooked note of citrus fruit juices or citrus fruit flavored foodstuffs and beverages which composition comprises having added thereto a product resulting from the above described process.

The process of this invention comprises reacting at a temperature of between about 50° and 120° C. an amino acid, or a mixture of amino acids, with a mixture consisting of
a. a carbohydrate selected from the group consisting of pentoses and hexoses,
b. ascorbic acid,
c. thiamine hydrochloride,
d. a concentrated citrus fruit juice or a citrus fruit powder, or alternatively a mixture of aldehydes derived from citrus fruits, and optionally water,
during a period of time sufficient to develop a composition which upon dilution in water possessed the desired flavor note.

Suitable amino acids include the following:
glycine
α-alanine
valine
serine
threonine
histidine
arginine
aspartic acid
glutamic acid
pyroglutamic acid
cysteine
methionine
proline and
citrulline.

All of the above mentioned amino acids are intended in their L-diastereomeric configuration.

Preferred individual amino acids are glycine, α-alanine, valine, serine, threonine, histidine, arginine, cysteine, methionine, proline and citrulline.

Preferred combinations in accordance with the invention of the said amino acids including the following:

A.
 glycine
 α-alanine
 valine
B.
 serine
 threonine
C.
 cysteine
 methionine
D.
 proline
 citrulline,
E.
 histidine
 arginine, and
F.
 glycine
 cysteine
 methionine.

Preferred hexoses and pentoses are for example glucose, mannose, galactose, fructose, ribose, arabinose and xylose.

Typical aldehyde mixtures comprise one or more of the following compounds:
2-heptyldec-2-enal
acetaldehyde
2-octyldec-2-enal
butanal undecanal
2-ethylbutanal
2-hexylundec-2-enal
pentanal
2-octylundec-2-enal
trans-2-pentenal
dodecanal
hexanal
2-dodecenal
trans-2-hexenal
2-hexyldodec-2-enal
cis-2-hexenal
2-heptyldodec-2-enal
hexenal
tetradecanal
heptanal
citronellal
octanal
geranial
2-octenal
neral
octenal
citral
nonanal
α-sinensal
decanal
β-sinensal
2-decenal
benzaldehyde
trans-2-trans-4-decadienal
perillaldehyde
2-hexyldec-2-enal
formaldehyde.

Of course, the proportions at which the different ingredients are employed in the afore-mentioned mixtures play an important role in achieving the most satisfactory composition, though these proportions can be determined by a trial-and-error approach.

The reaction time varies somehow in accordance with the temperature at which the process is effected and in accordance with the particular vessel into which it is carried out.

The invention process can be carried out by mixing the chosen ingredients under stirring and heating the obtained reaction mixture possibly at a constant preselected temperature until the desired flavor develops.

The obtained reaction mixture might be added in its isolated form, or in admixture with other flavoring ingredients, edible solvents and carriers to the base to be flavored. The methods for applying the flavoring composition are common in the art.

The examples which follow give a more precise indication of some of the preferred embodiments of the invention. The invention shall be illustrated by the said examples but it is not limited thereto.

The present invention is also based on the discovery derived in the course of experimentation that whenever mixtures of amino acids containing glycine, cysteine and methionine were subjected to the above described process, in combination with the cited coingredients, the resulting product showed a fleshy, juicy and peely gustative character.

The presence of thiamine hydrochloride is in this case optional.

In order to achieve the desired results, a typical reaction mixture base consists of
D(+)-glucose monohydrate
ascorbic acid
a deterpenated natural citrus essential oil
and a mixture of the following amino acids:
glycine
serine
threonine
aspartic acid
glutamic acid
proline
cysteine, and
methionine.

Typically, the resulting mixture was heated at 90° C. for 3 hours. The product thus obtained, when tasted at a level of 2°/$_{oo}$ in water (see the described evaluation method) in the following examples, presented a more developed cooked character with a fleshy, juicy and peely undertone than the base.

EXAMPLES

1. Separate flavor bases each consisting of a mixture of
5 g of D(+)-glucose monohydrate
0.1 g of ascorbic acid
0.1 g of thiamine hydrochloride
0.1 g of TETRAROME ®[1] orange, and
1 g of water
[1]origin: FIRMENICH SA, a deterpenated natural orange essential oil
were admixed with the amino acid combinations A to G listed in Table I, and were reacted for 4 hours at 90° C.

TABLE 1

| Exp. | L-amino acid | Amount (mg) | Presence of cooked note Combination of amino acids | Presence of cooked note Individual amino acids |
|---|---|---|---|---|
| A | Glycine | 83 | +++ | + |
|   | α-Alanine | 51 |  | +++ |
|   | Valine | 31 |  | ++ |
|   | Leucine | 22 |  | 0 |
|   | Isoleucine | 23 |  | 0 |
| B | Serine | 23 | +++ | ++ |
|   | Threonine | 12 |  | +++ |
| C | Lysine | 43 | ++ | 0 |
|   | Histidine | 12 |  | ++ |
|   | Arginine | 52 |  | ++ |
| D | Phenylalanine | 30 | 0 | 0 |
|   | Tyrosine | 17 |  | 0 |
| E | Aspartic acid | 114 | 0 | 0 |
|   | Glutamic acid | 99 |  | 0 |
| F | Cysteine | 1 | + | + |
|   | Methionine | 1 |  | + |
| G | Proline | 45 | + | + |
|   | Citrulline | 10 |  | + |

0 no effect
+ moderate effect
++ good effect
+++ very good effect

The mixtures so obtained, to which there were added 20 mg of citric acid and 12 g of a sugar solution (65% dry product) per 100 grams, were evaluated in water with regard to their "cooked note" at a level of 2°/$_{oo}$ and compared with the reaction product to which no amino acids were added.

The samples were judged by a panel of six experienced tasters.

The evaluation results are summarized in the above table.

2. From the different groups of amino acids as well as from combinations of individual amino acids which were found interesting, different combinations were reacted under the reaction conditions described earlier.

The reaction products were then evaluated in a reconstituted commercial orange juice again at a level of 2°/oo. The different amino acid combinations are given in Table II.

TABLE II

| Amino Acid | Mixture milligrams of L-amino acid | | | | | | | | | | |
|---|---|---|---|---|---|---|---|---|---|---|---|
| | 1 | 2 | 3 | 4 | 5 | 6 | 7 | 8 | 9 | 10 | 11 |
| Glycine | 83 | 83 | 83 | — | — | — | — | — | — | — | — |
| α-Alanine | 51 | 51 | 51 | 51 | 51 | 51 | 51 | 51 | 100 | 200 | 400 |
| Valine | 31 | 31 | 31 | 31 | — | 31 | 31 | 31 | 31 | 31 | 31 |
| Leucine | 22 | — | — | — | — | — | — | — | — | — | — |
| Isoleucine | 23 | — | — | — | — | — | — | — | — | — | — |
| Serine | 23 | 23 | 23 | 23 | — | 23 | 23 | 23 | 23 | 23 | 23 |
| Threonine | 12 | 12 | 12 | 12 | 12 | 25 | 50 | 100 | 12 | 12 | 12 |
| Lysine | 43 | — | — | — | — | — | — | — | — | — | — |
| Histidine | 12 | 12 | 12 | — | — | 12 | 12 | 12 | 12 | 12 | 12 |
| Arginine | 52 | 52 | 52 | 52 | — | 52 | 52 | 52 | 52 | 52 | 52 |
| Proline | 45 | 45 | — | — | — | — | — | — | — | — | — |
| Citrulline | 10 | 10 | — | — | — | — | — | — | — | — | — |
| Cysteine | 1 | 1 | 1 | — | — | — | — | — | — | — | — |
| Methionine | 1 | 1 | 1 | — | — | — | — | — | — | — | — |

From the analysis of these experiments, it appears that there is much less difference in the "cooked note" between any of the combinations 1 to 4 than between 1–4 and 5. It is apparent therefore that by using the most important amino acids alone, e.g. alanine and threonine, there are obtained products whose cooked note is less marked than by using multi-component amino acid mixtures.

The increase of the amount of threonine in mixture 4 had a more marked effect on flavor than the increase of the amount of alanine. A typical effective mixture is given under no. 8.

3. Flavor composition for lemon juice

50 Grams of glucose monohydrate and 10 g of water were heated under stirring at 90° C. until homogeneity, whereupon the following mixture of ingredients was added thereto:

| Ingredient | Quantity [g] |
|---|---|
| Ascorbic acid | 1.000 |
| Leucine | 0.230 |
| Valine | 0.310 |
| α-Alanine | 0.510 |
| Glycine | 0.830 |
| Serine | 0.230 |
| Threonine | 0.120 |
| Aspartic acid | 1.140 |
| Glutamic acid | 1.000 |
| Proline | 0.450 |
| Cysteine | 0.006 |
| Methionine | 0.001 |
| TETRAROME ® lemon[1] | 10.000 |

[1]origin: Firmenich SA, deterpenated natural lemon essential oil in powder form.

The mixture was kept at 90° C. for 3 hours, then it was poured into 650 g of a 50% aqueous solution of maltodextrine and spray-dried.

When added to a commercial lemon juice at a concentration of 0.3% it conferred thereto a pleasant juicy-peely character.

The amino acids present in the above mixture constitute about 6.4% by weight of the composition.

4. Flavor composition for mandarin juice

The process was repeated by using the same ingredients, TETRAROME ® lemon was replaced however by TETRAROME ® mandarin (origin: Firmenich SA, deterpenated mandarin essential oil). The spray-dried powder was evaluated in a reconstituted mandarin drink at 0.2% and preferred over a drink obtained by using TETRAROME ® mandarin alone for its fleshy and juicy character.

5. Flavor composition for orange juice 70.22 Grams of glucose monohydrate and 14.093 g of water were heated under stirring at 90° C. until homogeneity. The following mixture of ingredients was then added thereto:

| Ingredient | Quantity [g] |
|---|---|
| Ascorbic acid | 1.400 |
| Threonine | 0.120 |
| Serine | 0.030 |
| Aspartic acid | 0.060 |
| Monosodium glutamate.H$_2$O | 0.040 |
| Proline | 0.030 |
| Cysteine.HCl.H$_2$O | 0.006 |
| Methionine | 0.001 |
| TETRAROME ® orange | 14.000 |
| Synth. orange essential oil[1] | 25.000 |

[1]origin: Firmenich SA, collection N° 502.366/A

The mixture was kept under stirring at 90° C. for three hours, then the reaction product was poured into 500 g of a 27% gum arabic solution, homogenized and spray-dried. When added to a commercial orange juice at a concentration of 0.2%, it conferred thereto a well marked juicy-peely character.

The amino acids present in the above mixture constitute about 0.2% by weight of the composition.

6. Aromatization of an instant orange drink powder

An instant orange drink powder base was prepared by mixing the following ingredients:

| Ingredient | Quantity [g] |
|---|---|
| Ascorbic acid | 0.50 |
| Dextrin | 0.62 |
| Tricalcium phosphate | 0.65 |
| Trisodium citrate | 0.65 |
| Pectin | 0.80 |
| Clouding agent* | 1.20 |
| Citric acid | 7.00 |
| Color** | 0.46 |
| Sugar, fine granulated | 121.12 |
| Total | 133.00 |

*Beatreme 2217 (Beatrice Foods Co.)
**Ariavit color sunset yellow at 10% (0.26 g) and Ariavit color tartrazine at 10% (0.20 g)

To this mixture, there were added 1.2 g of the flavor mixture obtained in example 5.

The resulting composition was diluted in 1 liter of cold water and the juice obtained was then evaluated by a panel of flavor experts. Its taste was found to be more cooked in character with a peely undertone by comparison with a juice obtained by adding TETRAROME ® orange and synth. orange essential oil [see example 5, [1]] to the described instant orange drink powder base.

7. Aromatization of a gelatin dessert powder

A gelatin dessert powder base was prepared by mixing the following ingredients:

| Ingredient | Quantity [g] |
|---|---|
| Disodium phosphate | 1.0 |
| Fumaric acid | 1.0 |
| Adipic acid | 1.7 |
| Gelatin | 7.7 |
| Sugar, fine granulated | 73.6 |

-continued

| Ingredient | Quantity [g] |
| --- | --- |
|  | 85.0 |

To this powder base, there were added 0.420 g of the flavor composition obtained in accordance with the preceding example 5 and 1 cup (240 ml) of boiling water was added to the resulting mixture while stirring. After complete solution of the ingredients, 1 cup (240 ml) of cold water was added and the obtained clear solution was chilled until setting.

The flavored gelatin thus obtained was tested by comparison with a control gelatin aromatized by TETRAROME® orange and synth. orange essential oil [see example 5,[1]]. Its taste was found to be more cooked and peely than that of the control dessert.

8. Aromatization of an instant mousse dessert powder

A mousse dessert powder base was prepared by mixing the following ingredients:

| Ingredient | Quantity [g] |
| --- | --- |
| Disodium phosphate | 0.142 |
| Tetrasodium phosphate | 0.428 |
| Whipping agent, with emulsifier* | 28.100 |
| Whipping agent, with emulsifier** | 25.000 |
| Citric acid | 0.585 |
| Starch*** | 4.275 |
| Icing sugar | 41.470 |
|  | 100.000 |

*VEE KREME-W/1
**Wiptreme 3120 (Beatrice Foods)
***Snowflake VN-56 (Maizena)

The flavor composition obtained in accordance with preceding example 5 was added to two fractions of 100 g each of instant mousse powder at a concentration of 0.4 and 0.8%, respectively. The resulting mixtures were each mixed with 300 ml of cold milk and the suspensions were whipped for 3 minutes, then poured into dessert cups and refrigerated for 1 hour before serving.

The taste evaluation carried out by a flavorists panel showed that the desserts thus flavored possessed a cooked, juicy-peely and fleshy gustative character.

What I claim is:

1. A process to improve or modify the taste and aroma of citrus fruit flavor compositions of both natural and synthetic origin by conferring thereto a cooked gustative, fleshy, juicy and peely character, which process comprises adding to said flavor compositions the product obtained by reacting at a temperature of between about 50° and 120° C., at least one L-diastereomeric form amino acid selected from glycine, α-alanine, valine, serine, threonine, histidine, arginine, cysteine, methionine, proline and citrulline, with a mixture consisting of:
   a. a carbohydrate selected from a pentose and a hexose,
   b. ascorbic acid,
   c. thiamine hydrochloride,
   d. a concentrated citrus fruit juice, a citrus fruit oil, or a mixture of aldehydes derived from citrus fruits, and, optionally,
   e. water;
during a time sufficient to develop a composition which, upon dilution in water, possesses the desired flavor note.

2. The process of claim 1 wherein the carbohydrate is glucose, mannose, galactose, fructose, ribose, arabinose, and xylose.

3. The process of claim 1 wherein the mixture of aldehydes comprises two or more of the following compounds:
   2-heptyldec-2-enal
   acetaldehyde
   2-octyldec-2-enal
   butanal
   undecanal
   2-ethylbutanal
   2-hexylundec-2-enal
   pentanal
   2-octylundec-2-enal
   trans-2-pentenal
   dodecanal
   hexanal
   2-dodecenal
   trans-2-hexenal
   2-hexyldodec-2-enal
   cis-2-hexenal
   2-heptyldodec-2-enal
   hexenal
   tetradecanal
   heptanal
   citronellal
   octanal
   geranial
   2-octenal
   neral
   octenal
   citral
   nonanal
   α-sinensal
   decanal
   β-sinensal
   2-decenal
   benzaldehyde
   trans-2-trans-4-decadienal
   perillaldehyde
   2-hexyldec-2-enal
   formaldehyde.

4. The process of claim 1 wherein wherein amino acids are present in an amount of between about 0.2 and 6.4% by weight of the composition.

5. A process to improve or modify the taste and aroma of citrus fruit flavor compositions of both natural and synthetic origin by conferring thereto a cooked gustative, fleshy, juicy and peely character, which process comprises adding to said flavor compositions the product obtained by reacting at a temperature of between about 50° and 120° C., at least one L-diastereomeric form amino acid selected from a mixture of any one of the following combinations:
   (1) glycine, α-alanine and valine;
   (2) serine and threonine;
   (3) cysteine and methionine;
   (4) proline and citrulline; and
   (5) histidine and arginine,
which amino acid in the total mixture is present in an amount sufficient to impart a cooked gustative character to said citrus fruit flavor composition, with a mixture consisting of:
   a. a carbohydrate selected from a pentose and a hexose,
   b. ascorbic acid,
   c. thiamine hydrochloride, d. a concentrated citrus fruit juice, a citrus fruit oil, or a mixture of aldehydes derived from citrus fruits, and, optionally, e. water;

during a time sufficient to develop a composition which, upon dilution in water, possesses the desired flavor note.

6. The process of claim 5 wherein the amino acid mixture is present in an amount of between about 0.2 and 6.4% by weight of the composition.

7. A process to improve or modify the taste and aroma of citrus fruit flavor compositions of both natural and synthetic origin by conferring thereto a cooked gustative, fleshy, juicy and peely character, said process consisting of adding to said flavor compositions the product obtained by reacting at a temperature of between about 50° and 120° C., at least one L-diastereomeric form amino acid selected from glycine, α-alanine, valine, serine, threonine, histidine, arginine, cysteine, methionine, proline and citrulline, with a mixture consisting of:

a. a carbohydrate selected from a pentose and a hexose, b. ascorbic acid, c. thiamine hydrochloride, d. a concentrated citrus fruit juice, a citrus fruit oil, or a mixture of aldehydes derived from citrus fruits, and e. water;

during a time sufficient to develop a composition which, upon dilution in water, possesses the desired flavor note.

8. The process of claim 7 wherein the amino acids are present in an amount of between about 0.2 and 6.4% by weight of the composition.

* * * * *